United States Patent
Steil et al.

(10) Patent No.: US 10,424,767 B2
(45) Date of Patent: Sep. 24, 2019

(54) FILLING DEVICE FOR FILLING BATTERY DEVICES WITH BATTERY CELLS

(71) Applicant: Robert Bosch GmbH, Stuttgart (DE)

(72) Inventors: Michael Steil, Korntal-Muenchingen (DE); Sarmimala Hore, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 264 days.

(21) Appl. No.: 15/296,243

(22) Filed: Oct. 18, 2016

(65) Prior Publication Data

US 2017/0110697 A1    Apr. 20, 2017

(30) Foreign Application Priority Data

Oct. 19, 2015    (DE) .................. 10 2015 220 334

(51) Int. Cl.

| | | |
|---|---|---|
| *H01M 2/10* | (2006.01) | |
| *H01M 10/613* | (2014.01) | |
| *H01M 10/625* | (2014.01) | |
| *H01M 10/653* | (2014.01) | |
| *H01M 10/04* | (2006.01) | |
| *H01M 10/62* | (2014.01) | |
| *H01M 10/643* | (2014.01) | |

(52) U.S. Cl.
CPC ..... *H01M 2/1077* (2013.01); *H01M 10/0404* (2013.01); *H01M 10/613* (2015.04); *H01M 10/62* (2015.04); *H01M 10/625* (2015.04); *H01M 10/653* (2015.04); *H01M 2/1005* (2013.01); *H01M 10/643* (2015.04); *H01M 2220/20* (2013.01); *Y02T 90/124* (2013.01)

(58) Field of Classification Search
CPC ............. H01M 2/1077; H01M 2/1005; H01M 2220/20; H01M 10/613; H01M 10/62; H01M 10/625; H01M 10/653; H01M 10/643

See application file for complete search history.

(56) References Cited

U.S. PATENT DOCUMENTS

| | | |
|---|---|---|
| 8,228,024 B1 | 7/2012 | Zander |
| 9,450,220 B2 * | 9/2016 | Holtappels ............ B60L 3/0046 |
| 2011/0177373 A1 | 7/2011 | Pellenc |
| 2014/0356670 A1 | 12/2014 | Haug et al. |

FOREIGN PATENT DOCUMENTS

| | | |
|---|---|---|
| DE | 102010023760 | 12/2011 |
| GB | 2516120 | 1/2015 |

\* cited by examiner

*Primary Examiner* — Jane J Rhee
(74) *Attorney, Agent, or Firm* — Michael Best & Friedrich LLP

(57) ABSTRACT

A filling device (1.1, 1.2, 1.3, 1.4) for filling battery devices (BV) with battery cells (4.1, 4.2, 4.3, 4.4, 4.5), in particular lithium-ion battery cells, comprising a retaining device (2.1, 2.2, 2.3, 2.4) with a fixing device (3.1, 3.2, 3.3, 3.4) for fixing battery cells (4.1, 4.2, 4.3, 4.4, 4.5), and a filling nozzle suitable for connecting to battery devices (BV) and for filling battery devices (BV) with battery cells, wherein the retaining device comprises a cooling device (5) that is suitable for cooling the retaining device and the battery cells.

20 Claims, 4 Drawing Sheets

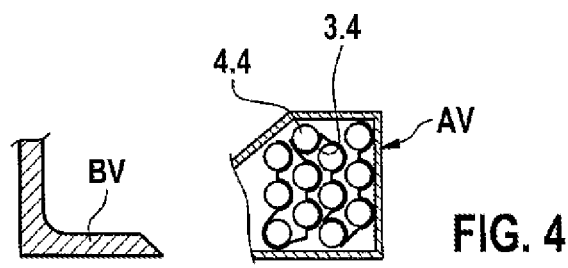
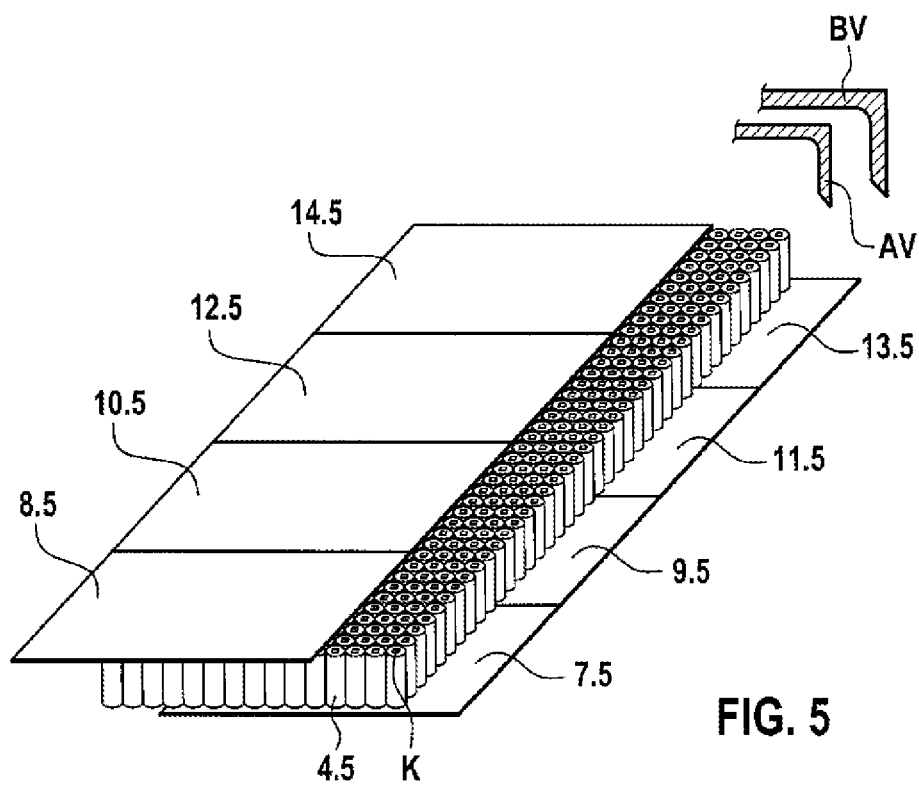
FIG. 4
FIG. 5

FILLING DEVICE FOR FILLING BATTERY DEVICES WITH BATTERY CELLS

BACKGROUND OF THE INVENTION

The present invention concerns a filling device for filling battery devices with battery cells, a battery device, a use of the filling device and the battery device and a method for filling battery devices with battery cells.

Methods and devices are known from the prior art that are suitable for filling battery devices with individual battery cells. In this case, for example, numbers of battery cells are disposed on special retaining devices, wherein the battery cells are provided to fill a battery pack or a battery module.

Moreover, retaining devices for battery cells are known, wherein the battery cells can be used in a battery device. Thus, for example, a device is disclosed in US 20110177373 that provides a number of cylindrical or prismatic battery cells in a retaining device.

Further, in U.S. Pat. No. 8,228,024 a battery container is disclosed, wherein the battery container provides storage of cylindrical or rectangular batteries in a magazine.

SUMMARY OF THE INVENTION

The invention is based on a filling device for filling battery devices with battery cells, in particular lithium-ion battery cells, wherein the filling device comprises a retaining device with fixing means for fixing battery cells. The filling device further comprises a filling nozzle, wherein the filling nozzle is suitable for connecting to battery devices and for filling battery devices with battery cells.

The core of the invention is that the retaining device comprises a cooling device, wherein the cooling device is suitable for cooling the retaining device and the battery cells.

Owing to the fact according to the invention that the retaining device comprises a cooling device that is suitable for cooling the retaining device and the battery cells, the battery cells and the retaining device can be cooled. In particular, the retaining device and the battery cells can be cooled during filling of the battery device with battery cells. Owing to the cooling of the retaining device and the battery cells, overheating and excessively high temperatures of the retaining device and the battery cells are prevented. Owing to the prevention of overheating and excessively high temperatures of the retaining device and the battery cells, potential damage to the retaining device and the battery cells is prevented. The background is that increased temperature and overheating are accompanied by the likelihood of damage to the retaining device, the battery cells and the battery device.

The cooling device can for example comprise hoses or an extruded profile, wherein the extruded profile comprises channels and is preferably made of aluminum. In this case, a cooling medium, in particular a cooling liquid, is passed by the retaining device and/or past the battery cells through the hoses or through the channels of the extruded profile so that the retaining device and/or the battery cells are cooled. In particular, the cooling device comprises a heat conducting material, in particular a metal film or a graphite film, preferably a graphite film with nanostructures, for example nanotubes, or Pyrolytic Graphite Sheets© or a ceramic filled polyurethane film.

The background to the invention is thus increasing safety when dealing with battery devices and filling devices for filling the battery devices with battery cells and ensuring the operational capability of battery devices and filling devices for filling the battery devices with battery cells.

A battery device, in particular a lithium-ion battery device, comprising a receptacle suitable for accommodating battery cells and contacting devices for making an electrical contact between individual battery cells is also in accordance with the invention. The battery device further comprises a connecting device, wherein the connecting device is suitable for connecting to a to a filling nozzle of a filling device according to the invention and for filling battery cells into the receptacle.

The use of a battery device according to the invention and/or a filling device according to the invention in a vehicle, in particular in a motor vehicle, is also according to the invention.

A method for filling a battery device with battery cells is also according to the invention, wherein a receptacle of the battery device that is suitable for accommodating battery cells is connected to a filling nozzle of a filling device, wherein at least one battery cell from the filling device is filled into the receptacle, wherein a retaining device of the filling device, which is suitable for fixing the at least one battery cell, is cooled by a cooling device, or wherein the process of filling at least one battery cell from the filling device into the receptacle is stopped depending on a stop signal. The stop signal can in particular occur if a safety-critical condition of the battery device, the receptacle or the filling device occurs and/or if the receptacle is completely filled with battery cells.

A battery device is preferably a rechargeable, electrochemical energy storage device. The battery device may contain devices for controlling the battery device, as well as preferably contacting devices. The contacting devices are in particular suitable for transferring electrical energy from the battery device to a load. The contacting devices can be so-called terminals. The load can in particular be a motor vehicle.

According to an advantageous embodiment of the invention, a driving device for displacing the battery cells, in particular for displacing the battery cells out through the filling nozzle from the filling device, is disposed on the filling device. An example of a driving device is a device comprising rollers with in particular a rubbery coating, wherein by rotating the rollers the battery cells or the retaining device are/is displaced and thereby transported through the filling nozzle out of the filling device. Alternatively to the wheels, the driving device can comprise gear wheels or bodies similar to gear wheels or cylindrical bodies that are matched to possible recesses in the battery cells or the retaining device. By rotating the gear wheels, bodies similar to gear wheels or cylindrical bodies, the battery cells or the retaining device can be displaced and thereby transported out of the filling device through the filling nozzle. Alternatively, the driving device can further comprise sliding rollers or a roll star or a feed star or a cam, which are suitable for displacing the battery cells or the retaining device.

According to a further preferable embodiment of the invention, the retaining device comprises at least one protection device. In this case the protection device is suitable for protecting the retaining device and the battery cells.

Owing to the fact according to the invention, that the retaining device comprises at least one protection device that is suitable for protecting the retaining device and the battery cells, safety in dealing with the filling device and the battery devices is increased further. Moreover, the operational capability of the retaining device and the battery cells is ensured.

According to a next preferable embodiment of the invention, the at least one protection device comprises a thermally insulating material, in particular a foam or thermoplastic elastomer film, or the at least one protection device comprises a thermally conducting material, in particular a metal film or a graphite film, preferably a graphite film with nanostructures, for example nanotubes, or Pyrolytic Graphite Sheets© or a ceramic filled polyurethane film.

Owing to the fact according to the invention that the at least one protection device comprises a thermally insulating material and in particular a foam or thermoplastic elastomer film, an increase of the temperature of the retaining device is prevented. The prevention of the increase in the temperature of the retaining device is accompanied by ensuring the operational capability of the retaining device. The background to ensuring the operational capability of the retaining device is that damage to the retaining device and/or the battery cells can occur owing to excessively high temperatures.

Owing to the fact according to the invention that the at least one protection device comprises a thermally conducting material and in particular a metal film or a graphite film, preferably a graphite film with nanostructures, for example nanotubes, or Pyrolytic Graphite Sheets© or a ceramic filled polyurethane film, safety is further increased in dealing with the retaining device and ensuring the operational capability of the retaining device. The background is that high temperatures that may occur can be reduced because the heat is carried away.

According to a next preferable embodiment of the invention, the at least one protection device comprises an electrically insulating material, in particular a ceramic filled polyurethane film, a thermoplastic elastomer film, preferably a thermoplastic elastomer film filled with glass fiber and/or a ceramic, and/or a mechanical damping material, in particular a polyurethane foam, preferably a microcellular polyurethane foam, a neoprene, a silicon, a rubbery foam or a rubber, and/or a mechanical stabilizing material, in particular a polyurethane foam, preferably a microcellular polyurethane foam, a neoprene, a silicon, a rubbery foam or a rubber.

Owing to the fact according to the invention that the at least one protection device comprises an electrically insulating material, in particular a ceramic filled polyurethane film, a thermoplastic elastomer film, preferably a thermoplastic elastomer film filled with glass fiber and/or a ceramic, and/or a mechanical damping material, in particular a polyurethane foam, preferably a microcellular polyurethane foam, a neoprene, a silicon, a rubbery foam or a rubber, and/or a mechanical stabilizing material, in particular a polyurethane foam, preferably a microcellular polyurethane foam, a neoprene, a silicon, a rubbery foam or a rubber, safety is increased further when dealing with the battery device and the filling device.

The fact that it is an electrically insulating material results in a reduction of the probability of the occurrence of electrical short circuits.

The fact that it is a mechanical damping material results in the advantage according to the invention that the retaining device is protected against mechanical influences, such as can occur for example during an accident.

The fact that it is a mechanically stabilizing material results in the advantage according to the invention that the retaining device is particularly protected against mechanical influences, such as can occur for example in an accident.

According to a next preferable embodiment of the invention, the retaining device comprises at least one control device. In this case the at least one control device is suitable for detecting at least one physical variable of the filling device. The at least one control device comprises in particular a pressure sensor, a temperature sensor, a current sensor, a voltage sensor, a moisture sensor and/or a pressure wave transducer, in particular a sound transducer.

By means of the at least one control device, it can moreover be determined whether at least one battery cell or the retaining device is damaged.

According to a next preferable embodiment of the invention, the retaining device comprises at least one signal transmission device. The at least one signal transmission device is in particular an electrical or fiber optic cable.

Owing to the fact according to the invention that the retaining device comprises at least one signal transmission device, in particular an electrical or fiber optic cable, information that can for example be obtained by means of the at least one control device will be forwarded and processed. Moreover, the retaining device is actuated and monitored by means of the at least one signal transmission device.

According to a next preferable embodiment of the invention, a monitoring device is disposed on the battery device according to the invention. The monitoring device is disposed on the battery device for monitoring the filling of battery cells into the receptacle. The monitoring device is in particular a monitoring device that comprises an optical monitoring means, for example a camera. Alternatively or additionally, the monitoring device can comprise a means for detecting pulling forces or pushing forces, wherein the means is suitable for detecting an irregular motion of the retaining device or at least one battery cell. Further, the monitoring device can alternatively or additionally comprise a position sensor, wherein the position sensor is suitable for detecting a position of at least one individual battery cell. Alternatively or additionally, the receptacle of the battery device can have a profile such that positioning of individual battery cells is ensured using the profile.

In this case the profile is formed such that individual battery cells are accommodated in recesses of the profile during filling into the receptacle.

The monitoring device can in particular be disposed on the receptacle.

In particular, a measure for increasing safety can be initiated depending on a signal produced by the monitoring device.

Further, the process of filling battery cells into the receptacle can be stopped depending on a signal of the monitoring device.

According to a next preferable embodiment of the invention, a pulling device or a suction device that is suitable for pulling in battery cells from the filling nozzle into the receptacle of the battery device is disposed on the battery device according to the invention. The pulling device is in particular a pulling device that comprises a pulling cord or a pulling wire, wherein the pulling cord or the pulling wire is suitable for pulling in battery cells from the filling nozzle into the receptacle of the battery device.

The suction device can in particular be suitable for producing a reduced pressure in the receptacle so that the retaining device and/or the battery cells are sucked into the receptacle.

According to a next preferable embodiment of the invention, the filling of the battery device is monitored by means of a monitoring device. The monitoring device is in particular a monitoring device according to the invention.

According to a further advantageous embodiment of the invention, at least one battery cell is pulled out of the filling nozzle into the receptacle by means of a pulling device, in particular by means of a pulling device according to the invention, or a suction device.

BRIEF DESCRIPTION OF THE DRAWINGS

The invention is described below using exemplary embodiments, from which further inventive features can be revealed, to which the invention is not however limited in its scope. The exemplary embodiments are represented in the figures. In the figures:

FIG. 4 the schematic representation of a battery device according to the invention according to a first embodiment;

FIG. 5 the schematic representation of a battery device according to the invention according to a second embodiment;

DETAILED DESCRIPTION

Figure 1:
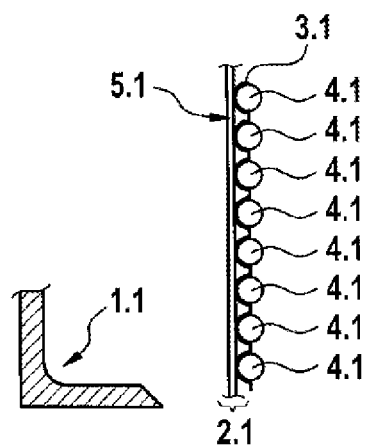
FIG. 1 shows the schematic representation of a filling device according to the invention according to a first embodiment.

In FIG. 1 a filling device according to the invention for filling battery devices with battery cells according to a first embodiment is represented schematically. The filling device is denoted with 1.1. The filling device 1.1 comprises a retaining device, wherein the retaining device is denoted with 2.1. According to the embodiment schematically represented in FIG. 1, the retaining device 2.1 comprises a number of concave shaped fixing means. The concave shaped fixing means are denoted with 3.1. Battery cells, denoted with 4.1, can be disposed and fixed in the concave shaped fixing means 3.1. A cooling device of the retaining device 2.1 is denoted with 5.1, wherein the cooling device 5.1 according to said embodiment is in the form of a cooling channel. The cooling channel can conduct a fluid flow, wherein the fluid can be a gas, in particular air, or a cooling liquid. The cooling liquid is in particular water or a water-glycol mixture, in particular in the ratio 50:50. Further, the cooling channel can conduct a flow of a coolant, for example of 1,1,1,2.tetrafluoroethane or of 2,3,3,3 tetrafluoropropene.

Figure 2:
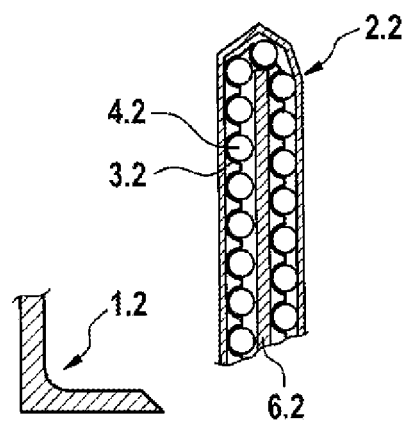
FIG. 2 shows the schematic representation of a filling device according to the invention according to a second embodiment.

In FIG. 2 a filling device 1.2 according to the invention according to a second embodiment is schematically represented. In contrast to the embodiment schematically represented in FIG. 1, the retaining device 2.2 is designed so that the fixing means 3.2 form a folded layer with the battery cells 4.2. A metal strip is disposed between the fixing means 3.2 and the battery cells 4.2. The metal strip, which is denoted with 6.2, comprises in particular an insulation material. The insulation material reduces the probability of the occurrence of an electrical short circuit between individual battery cells 4.2. Moreover, the insulation material prevents the individual battery cells 4.2 from butting against each other. The insulation material can in particular be a polyurethane foam, preferably a microcellular polyurethane foam, a neoprene, a silicon, a rubbery foam or a rubber. For example, the retaining device can also be enclosed on both sides by the insulation material.

Figure 3:
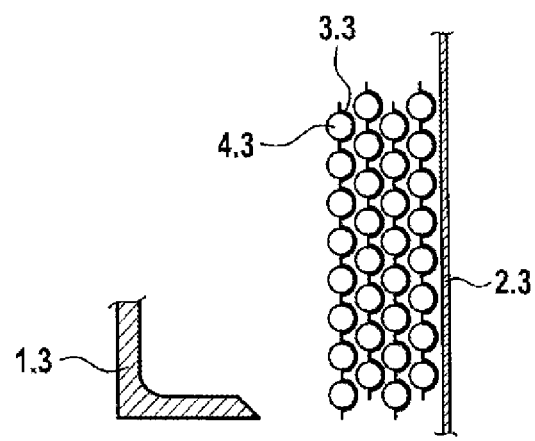
FIG. 3 shows the schematic representation of a filling device according to the invention according to a third embodiment.

In FIG. 3 a filling device 1.3 according to the invention according to a third embodiment is schematically represented. According to the embodiment of the filling device 1.3 schematically represented in FIG. 3, the fixing means 3.3 and the battery cells 4.3 are disposed within the retaining device 2.3 in the form of a multiply folded layer.

In FIG. 4 a battery device BV according to the invention according to a first embodiment is schematically represented. According to the embodiment of the battery device BV represented in FIG. 4, the fixing means 3.4 and the battery cells 4.4 are disposed in a multiply folded layer in a receptacle AV.

In FIG. 5 a battery device BV according to the invention according to a second embodiment is schematically represented. The battery device BV comprises a receptacle AV, wherein the receptacle AV is suitable for accommodating battery cells 4.5. According to the embodiment schematically represented in FIG. 5, the battery cells 4.5 are accommodated in the receptacle AV and electrically connected to each other. The electrical connection of the battery cells 4.5 is made by contact means 7.5, 8.5, 9.5, 10.5, 11.5, 12.5, 13.5 and 14.5. In this case, contact means 8.5 is electrically conductively connected to contact means 9.5, contact means 10.5 is electrically conductively connected to contact means 11.5 and contact means 12.5 is electrically conductively connected to contact means 13.5. Contact means 8.5 is electrically connected by means of battery cells 4.5 to contact means 7.5. Contact means 10.5 is electrically connected by means of battery cells 4.5 to contact means 9.5.

Contact means 12.5 is electrically connected by means of battery cells 4.5 to contact means 11.5.

Contact means 14.5 is electrically connected by means of battery cells 4.5 to contact means 13.5.

According to the embodiment represented in FIG. 5, the contact means 7.5 forms a negative electrical potential. The contact means 14.5 forms a positive electrical potential according to the embodiment represented in FIG. 5.

In this way connection of the battery cells 4.5 that consists of four stages electrically connected in series is enabled. Each stage can consist of a number of battery cells 4.5 connected in parallel. The battery cells 4.5 comprise contact points K, wherein the contact points K are suitable for making an electrical contact. In the case in which the battery cells 4.5 are to be fed into the receptacle AV, the contact means 8.5, 10.5, 12.5 and 14.5 can be lifted from the battery cells 4.5 so that said contact means have no electrical contact with the battery cells 4.5. After inserting all the battery cells 4.5 into the receptacle AV, the contact means 8.5, 10.5, 12.5, and 14.5 can be lowered again so that said contact means are in electrical contact with battery cells 4.5, for example by means of the contact points K. According to the embodiment represented in FIG. 5, in order to give a better view the contact elements 8.5, 10.5, 12.5 and 14.5 are shown laterally offset in relation to the battery cells 4.5 and in relation to the contact means 7.5, 9.5, 11.5 and 13.5.

In addition to the embodiment represented in FIG. 5, other numbers of contact means and other forms of the contact means as well as the receptacle AV are possible.

Figure 6:
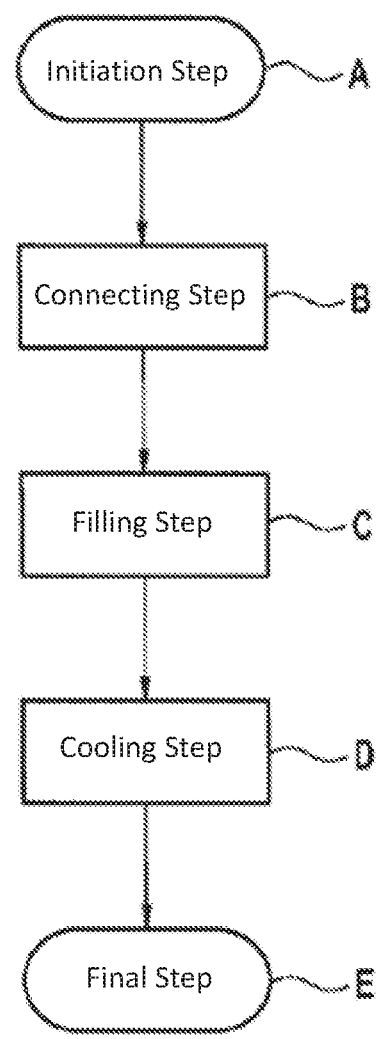
FIG. 6 the schematic representation of a method according to the invention.
Figure 7:
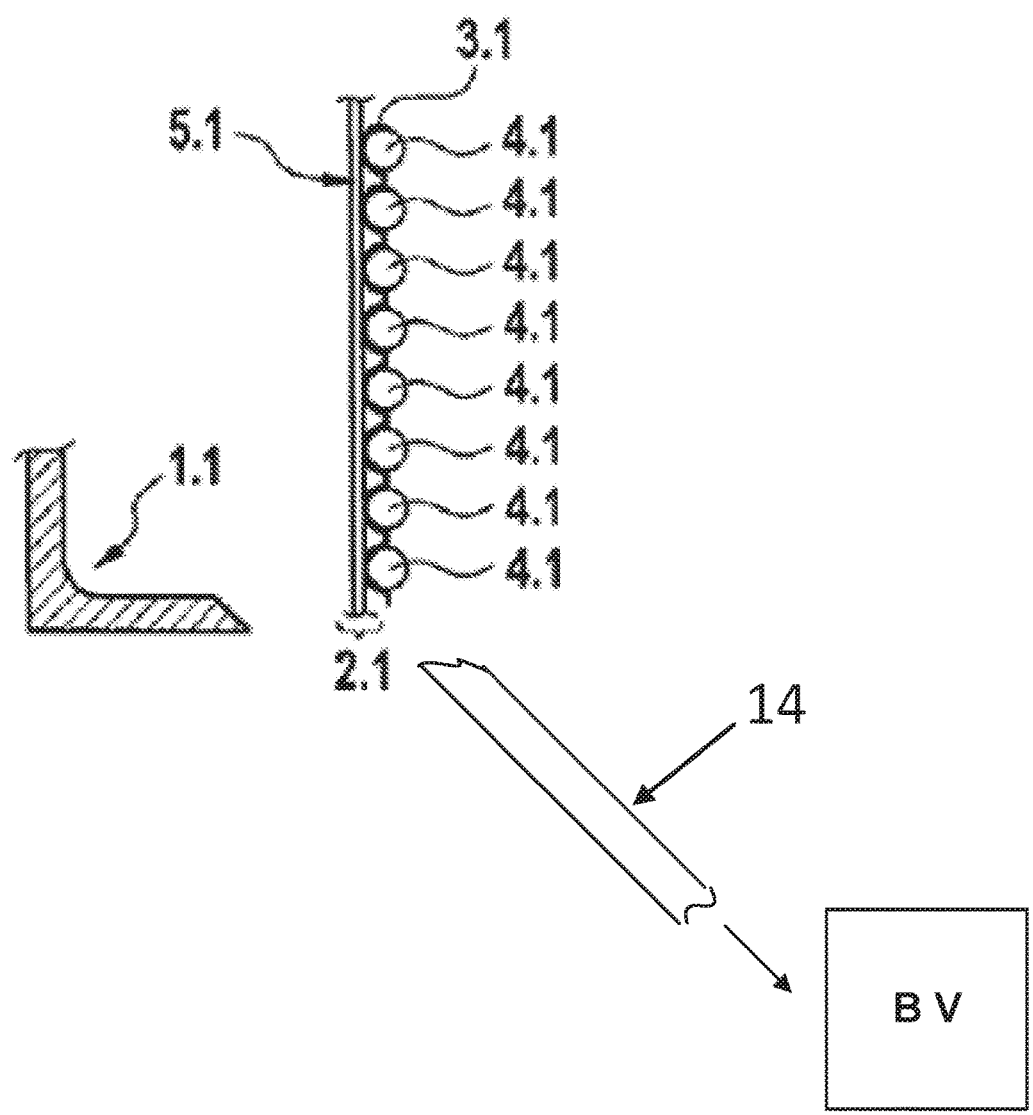
FIG. 7 shows the schematic representation of a filling device according to the first embodiment and a nozzle suitable for connecting to battery devices and for filling battery devices with battery cells.

In FIG. 6 a method according to the invention is schematically represented. In this case it is a method for filling a battery device with battery cells. The procedure is started with the procedure initiation step A. In the connecting step B, a receptacle is connected to a filling nozzle 14 (depicted in FIG. 7) of a filling device. Here the receptacle is a receptacle of the battery device. In the filling step C, at least one battery cell from the filling device is filled into the receptacle. In the cooling step D, a retaining device of the filling device is cooled by a cooling device. The retaining device comprises a fixing means for fixing battery cells to the retaining device.

Alternatively, the cooling step D can also be carried out at the same time as the connecting step B and/or the filling step C. The procedure is terminated in the final step E.

The invention claimed is:

1. A filling device (1.1, 1.2, 1.3, 1.4) for filling battery devices (BV) with battery cells (4.1, 4.2, 4.3, 4.4, 4.5), comprising a retaining device (2.1, 2.2, 2.3, 2.4) with fixing means (3.1, 3.2, 3.3, 3.4) for holding and fixing battery cells (4.1, 4.2, 4.3, 4.4, 4.5), and a filling nozzle, wherein the filling nozzle is configured to be connected to battery devices (BV) for transferring battery cells from the retaining device to the battery devices for filling the battery devices (BV) with the battery cells (4.1, 4.2, 4.3, 4.4, 4.5), characterized in that the filling device comprises a cooling device (5) that is configured to cool the retaining device (2.1, 2.2, 2.3, 2.4) and the battery cells (4.1, 4.2, 4.3, 4.4, 4.5), wherein the cooling device includes a cooling channel adjacent the fixing means, the cooling channel being configured to conduct a cooling fluid.

2. The filling device (1.1, 1.2, 1.3, 1.4) according to claim 1, characterized in that a driving device for displacing the battery cells (4.1, 4.2, 4.3, 4.4, 4.5) is disposed on the filling device (1.1, 1.2, 1.3, 1.4).

3. The filling device (1.1, 1.2, 1.3, 1.4) according to claim 1, characterized in that the retaining device (2.1, 2.2, 2.3, 2.4) comprises at least one protection device (6.2) that is configured for protecting the retaining device (2.1, 2.2, 2.3, 2.4) and the battery cells (4.1, 4.2, 4.3, 4.4, 4.5).

4. The filling device (1.1, 1.2, 1.3, 1.4) according to claim 3, characterized in that the at least one protection device (6.2) comprises a thermally insulating material, or that the at least one protection device comprises a thermally conducting material.

5. The filling device (1.1, 1.2, 1.3, 1.4) according to claim 3, characterized in that the at least one protection device (6.2) comprises an electrically insulating material, in particular a ceramic filled polyurethane film, a thermoplastic elastomer film, preferably a thermoplastic elastomer film filled with glass fiber and/or a ceramic, and/or a mechanical damping material, in particular a polyurethane foam, preferably a microcellular polyurethane foam, a neoprene, a silicon, a rubbery foam or a rubber, and/or a mechanical stabilizing material, in particular a polyurethane foam, preferably a microcellular polyurethane foam, a neoprene, a silicon, a rubbery foam or a rubber.

6. The filling device (1.1, 1.2, 1.3, 1.4) according to claim 1, characterized in that the retaining device (2.1, 2.2, 2.3, 2.4) comprises at least one control device that is configured for detecting at least one physical variable of the filling device (1.1, 1.2, 1.3, 1.4).

7. The filling device (1.1, 1.2, 1.3, 1.4) according to claim 1, characterized in that the retaining device (2.1, 2.2, 2.3, 2.4) comprises at least one signal transmission device for transmitting information.

8. A battery device (BV) comprising a connecting device configured for connecting to a filling nozzle of a filling device according to claim 1, the battery device also comprising a receptacle (AV) that is configured for accommodating battery cells (4.1, 4.2, 4.3, 4.4, 4.5), and contacting devices (7.5, 8.5, 9.5, 10.5, 11.5, 12.5, 13.5, 14.5) for making an electrical contact between individual battery cells (4.1, 4.2, 4.3, 4.4, 4.5), wherein the connecting device is configured for filling battery cells (4.1, 4.2, 4.3, 4.4, 4.5) into the receptacle (AV).

9. The battery device (BV) according to claim 8, characterized in that a monitoring device, a means for detecting pulling forces or pushing forces or a position sensor, that is configured for monitoring the filling of battery cells (4.1, 4.2, 4.3, 4.4, 4.5) into the receptacle (AV) is disposed on the battery device (BV).

10. The battery device (BV) according to claim 8, characterized in that a pulling device or a suction device suitable for pulling in battery cells (4.1, 4.2, 4.3, 4.4, 4.5) out of the filling nozzle into the receptacle (AV) is disposed on the battery device (BV).

11. A method for filling a battery device (BV) with battery cells (4.1, 4.2, 4.3, 4.4, 4.5) using the filling device of claim 1, wherein a receptacle (AV) of the battery device (BV) that is configured for accommodating battery cells (4.1, 4.2, 4.3, 4.4, 4.5) is connected (B) to a filling nozzle of the filling device (1.1, 1.2, 1.3, 1.4), wherein at least one battery cell (4.1, 4.2, 4.3, 4.4, 4.5) from the filling device (1.1, 1.2, 1.3, 1.4) is filled (C) into the receptacle (AV), characterized in that a retaining device (2.1, 2.2, 2.3, 2.4) of the filling device (1.1, 1.2, 1.3, 1.4), wherein the retaining device (2.1, 2.2, 2.3, 2.4) is configured for fixing the at least one battery cell (4.1, 4.2, 4.3, 4.4, 4.5), is cooled (D) by a cooling device or that the process of filling at least one battery cell (4.1, 4.2, 4.3, 4.4, 4.5) from the filling device (1.1, 1.2, 1.3, 1.4) into the receptacle (AV) is terminated depending on a stop signal.

12. The method according to claim 11, characterized in that filling the battery device (BV) is monitored by means of a monitoring device, using a means for detecting pulling forces or pushing forces or by means of a position sensor.

13. The method according to claim 11, characterized in that at least one battery cell (4.1, 4.2, 4.3, 4.4, 4.5) is pulled into the receptacle (AV) from the filling nozzle by means of a pulling device or by means of a suction device.

14. The filling device (1.1, 1.2, 1.3, 1.4) according to claim 1, characterized in that a driving device, for displacing the battery cells (4.1, 4.2, 4.3, 4.4, 4.5) out of the filling device (1.1, 1.2, 1.3, 1.4) through the filling nozzle, is disposed on the filling device (1.1, 1.2, 1.3, 1.4).

15. The filling device (1.1, 1.2, 1.3, 1.4) according to claim 3, characterized in that the at least one protection device (6.2) comprises a thermally insulating material, in particular a foam or a thermoplastic elastomer film, or that the at least one protection device comprises a thermally conducting material, in particular a metal film or a graphite film, preferably a graphite film with nanostructures, for example nanotubes, or Pyrolytic Graphite Sheets© or a ceramic filled polyurethane film.

16. The filling device (1.1, 1.2, 1.3, 1.4) according to claim 1, characterized in that the retaining device (2.1, 2.2, 2.3, 2.4) comprises at least one control device that is suitable for detecting at least one physical variable of the filling device (1.1, 1.2, 1.3, 1.4), wherein the at least one control device comprises a pressure sensor, a temperature sensor, a current sensor and/or a voltage sensor.

17. The filling device (1.1, 1.2, 1.3, 1.4) according to claim 1, characterized in that the retaining device (2.1, 2.2, 2.3, 2.4) comprises at least one signal transmission device for transmitting information, wherein the signal transmission device includes an electrical cable or a fiber optic cable.

18. The battery device (BV) according to claim 8, characterized in that an optical monitoring means, a means for detecting pulling forces or pushing forces or a position sensor, that is suitable for monitoring the filling of battery cells (4.1, 4.2, 4.3, 4.4, 4.5) into the receptacle (AV) is disposed on the battery device (BV).

19. The battery device (BV) according to claim 8, characterized in that a pulling device comprising a pulling cord or a pulling wire, or a suction device suitable for pulling in battery cells (4.1, 4.2, 4.3, 4.4, 4.5) out of the filling nozzle into the receptacle (AV) is disposed on the battery device (BV).

20. The method according to claim 11, characterized in that filling the battery device (BV) is monitored by means of an optical monitoring means, using a means for detecting pulling forces or pushing forces or by means of a position sensor.

* * * * *